United States Patent
Ramia

(10) Patent No.: US 11,554,535 B2
(45) Date of Patent: Jan. 17, 2023

(54) VARIABLE NOZZLE EXTRUSION SYSTEM FOR 3D PRINTING

(71) Applicant: Maurizio Ramia, Lakeland, FL (US)

(72) Inventor: Maurizio Ramia, Lakeland, FL (US)

( * ) Notice: Subject to any disclaimer, the term of this patent is extended or adjusted under 35 U.S.C. 154(b) by 0 days.

(21) Appl. No.: 16/983,776

(22) Filed: Aug. 3, 2020

(65) Prior Publication Data

US 2021/0031436 A1    Feb. 4, 2021

Related U.S. Application Data

(60) Provisional application No. 62/882,507, filed on Aug. 3, 2019.

(51) Int. Cl.
| | | |
|---|---|---|
| *B29C 64/118* | (2017.01) | |
| *B29C 64/209* | (2017.01) | |
| *B29C 64/321* | (2017.01) | |
| *B29C 64/295* | (2017.01) | |
| *B33Y 30/00* | (2015.01) | |

(52) U.S. Cl.
CPC .......... *B29C 64/118* (2017.08); *B29C 64/209* (2017.08); *B29C 64/295* (2017.08); *B29C 64/321* (2017.08); *B33Y 30/00* (2014.12)

(58) Field of Classification Search
CPC ... B29C 64/118; B29C 64/209; B29C 64/321; B29C 64/295; B33Y 30/00
See application file for complete search history.

(56) References Cited

U.S. PATENT DOCUMENTS

| | | | |
|---|---|---|---|
| 4,094,492 A * | 6/1978 | Beeman | F16K 3/03 |
| | | | 138/45 |
| 2014/0252668 A1* | 9/2014 | Austin | B28B 3/20 |
| | | | 264/40.7 |
| 2018/0236713 A1* | 8/2018 | Robert | B29C 64/295 |
| 2018/0370117 A1* | 12/2018 | Gardiner | B29C 64/232 |
| 2020/0338821 A1* | 10/2020 | Anegawa | B29C 64/321 |

* cited by examiner

*Primary Examiner* — Joseph S Del Sole
*Assistant Examiner* — Mohamed K Ahmed Ali
(74) *Attorney, Agent, or Firm* — Roman Khasidov; Haug Partners LLP

(57) ABSTRACT

Embodiments of the present invention provide for a material extrusion system for three-dimensional (3D) printing/additive manufacturing. The material extrusion system can include a nozzle head configured to extrude a liquefied material of variable widths through an adjustable orifice, wherein the nozzle head can change sizes during a line to compensate for wider or thinner wall thickness.

3 Claims, 6 Drawing Sheets

VARIABLE NOZZLE EXTRUSION SYSTEM FOR 3D PRINTING

CROSS-REFERENCE TO RELATED APPLICATION

This application claims the benefit of U.S. Provisional Patent Application No. 62/882,507, which was filed on Aug. 3, 2019 and is incorporated by reference in its entirety.

FIELD OF THE INVENTION

The present disclosure relates to a material extrusion system for three-dimensional (3D) printing/additive manufacturing.

BACKGROUND OF THE INVENTION

Additive manufacturing is one of the most important emerging technologies. Through the last 10 years, additive manufacturing (or 3D printing) has grown exponentially in a wide variety of industries. The material delivery mechanism is an intrinsic part of the process, allowing the user to build their design through layers of material deposition.

Developments in additive manufacturing or 3D printing have improved print speeds and quality, and have reduced costs. But the principles of the deposition tools have not changed for many years. Although improvements have been made, no technology has broken the linear cycle of evolution.

There is a wide variety of extrusion systems: some allow the user to print using pellets, some use filament, while others use viscous materials. But all of these suffer from the same drawback: throughout the whole process, the width of material deposited at each point remains fixed.

Current extrusion systems have further shortcomings. For example, solutions that can quickly build large areas usually have low resolution. Conversely, fine-quality extruders output low amounts of material and require long print times.

It would be desirable to have systems that could overcome these and other deficiencies of known systems.

SUMMARY OF THE INVENTION

Embodiments of the present invention relate to a material extrusion system for 3D printing/additive manufacturing.

According to an embodiment, a material extrusion system for additive manufacturing can include: a pellet feeder configured to receive pellets of a material; a plurality of heating elements configured to heat the pellets of the material to a liquefied state; and a nozzle head configured to extrude the liquefied material of variable widths through an adjustable orifice.

According to another embodiment, a material extrusion system for additive manufacturing can include: a nozzle head configured to extrude a liquefied material of variable widths through an adjustable orifice, wherein the nozzle head includes a plurality of adjustable jaws forming the adjustable orifice.

According to an embodiment, the nozzle head is a gear-driven system that adjusts to deposit/extrude a different range of material widths, which is capable of forming complex shapes for 3D printing or additive manufacturing. This nozzle head can be controlled by software that allows the system to deposit various widths of material depending on the dimensions of the feature to be modeled. The deposition modeling tool is fed through a high throughput screw system where the material is heated and then flows through the nozzle output, where it is shaped to the specific layer width and height.

According to an embodiment, with the exemplary material extrusion system, a wide range of nozzle sizes can be implemented without the need to have several extrusion systems, switch nozzles, pause prints, or otherwise receive human assistance. Further, with the dynamic nozzle, the exemplary system is able to achieve high-detail components as well as low-resolution lines with just one tool, e.g., creating a perimeter at 1 mm width and an infill of 5 mm.

Further, the active variable nozzle can also change sizes during a line to compensate for wider or thinner wall thicknesses, thereby reducing to one stroke what previously would have been done by two or more print movements.

These and other advantages will be described more fully in the following detailed description.

BRIEF DESCRIPTION OF THE DRAWINGS

Some aspects of the disclosure are herein described, by way of example only, with reference to the accompanying drawings. With specific reference now to the drawings in detail, it is stressed that the particulars shown are by way of example and are for purposes of illustrative discussion of embodiments of the disclosure. In this regard, the description, taken with the drawings, makes apparent to those skilled in the art how aspects of the disclosure may be practiced.

DETAILED DESCRIPTION

This description is not intended to be a detailed catalog of all the different ways in which the disclosure may be implemented or all the features that may be added to this disclosure. For example, features illustrated with respect to one embodiment may be incorporated into other embodiments, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of this disclosure, which do not depart from the disclosure. In other instances, well-known structures, interfaces, and processes have not been shown in detail to avoid unnecessarily obscuring the invention. It is intended that no part of this specification be construed to affect a disavowal of any part of the full scope of the invention. Hence, the following descriptions are intended to illustrate some particular embodiments of the disclosure, and not to exhaustively specify all permutations, combinations and variations thereof.

Unless explicitly stated otherwise, the definition of any term herein is solely for identification and the reader's convenience; no such definition shall be taken to mean that any term is being given any meaning other than that commonly understood by one of ordinary skill in the art to which this disclosure belongs, unless the definition herein cannot reasonably be reconciled with that meaning. Further, in the absence of such explicit definition, all technical and scientific terms used herein have the same meaning as commonly understood by one of ordinary skill in the art to which this disclosure belongs. The terminology used in the description of the disclosure herein is for the purpose of describing particular embodiments only and is not intended to be limiting of the disclosure.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

As used in the description of the disclosure and the appended claims, the singular forms "a", "an", and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

Figure 1:
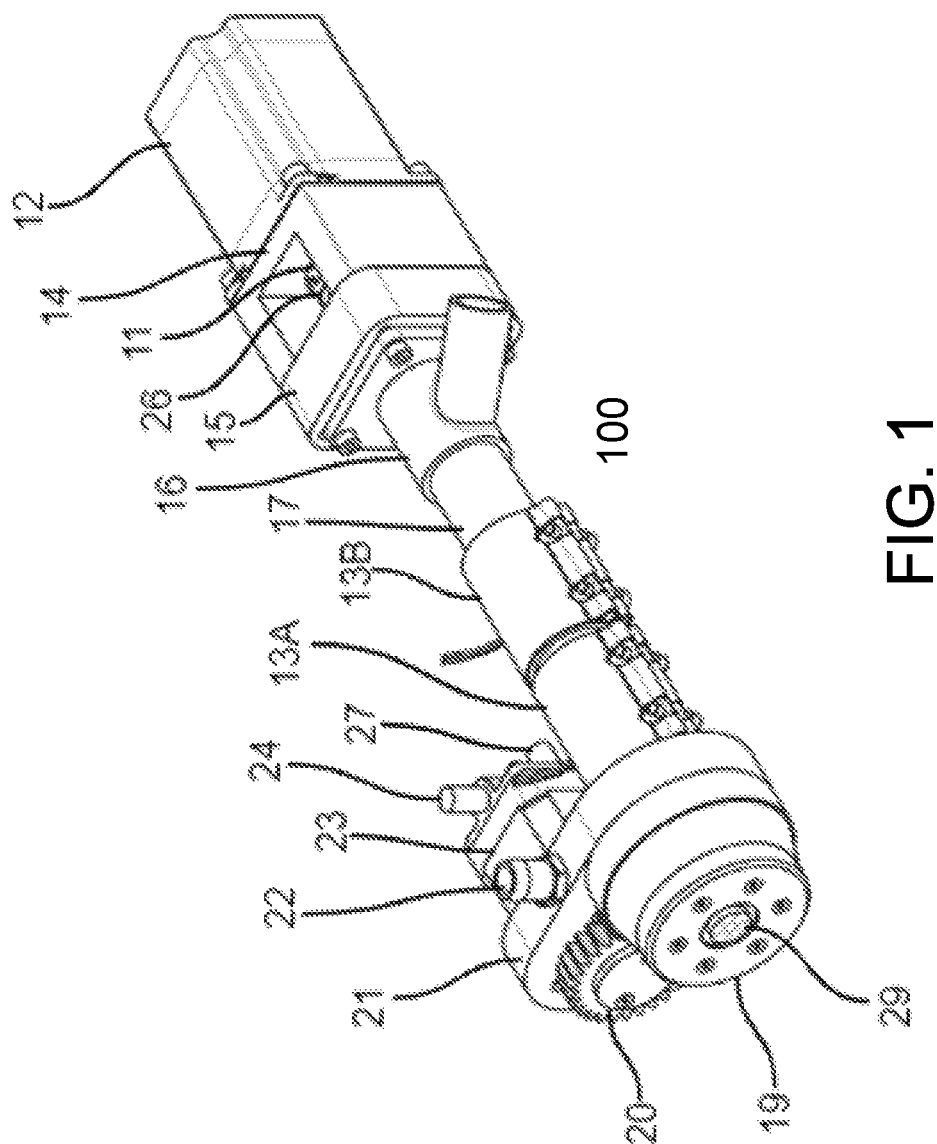
FIG. 1 depicts a perspective view of a variable nozzle extrusion system according to exemplary embodiment of the invention.
Figure 2:
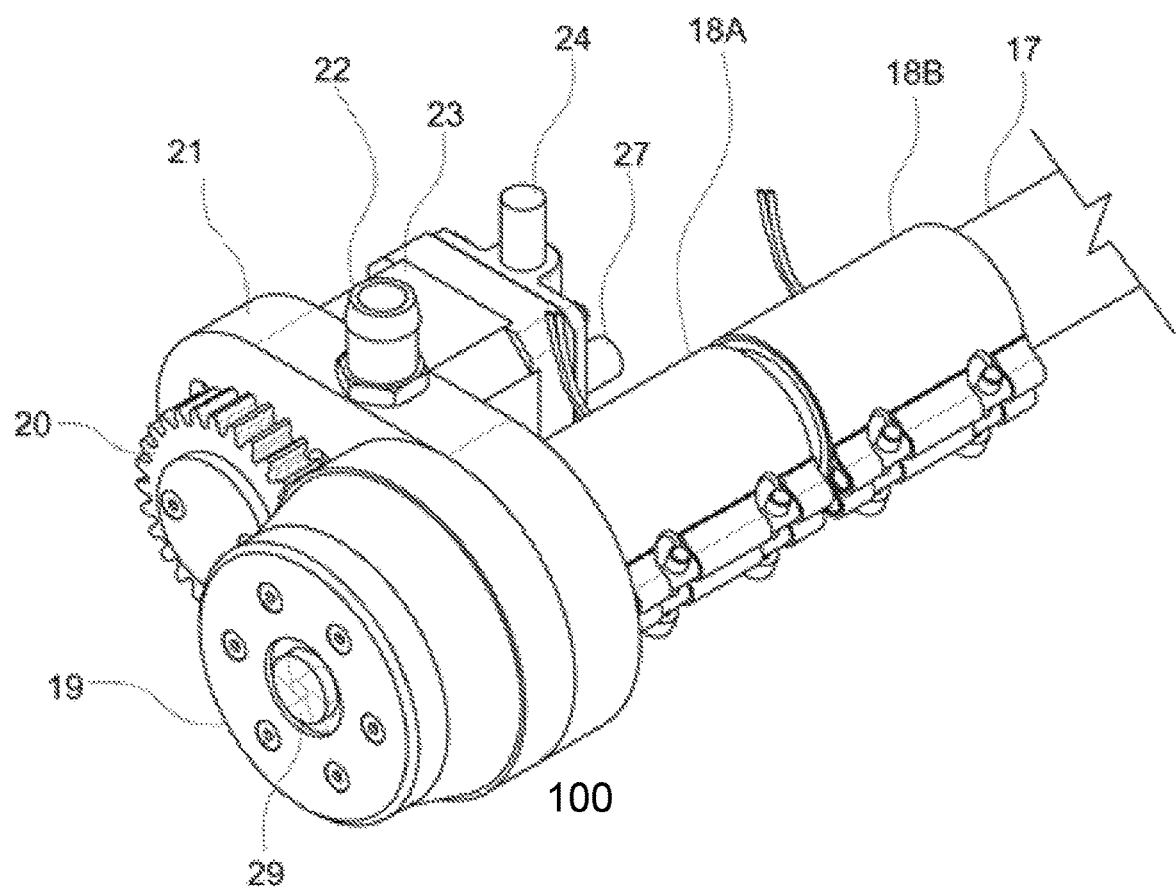
FIG. 2 depicts a close-up view of the variable nozzle extrusion system in FIG. 1 according to an exemplary embodiment of the invention.
Figure 3:
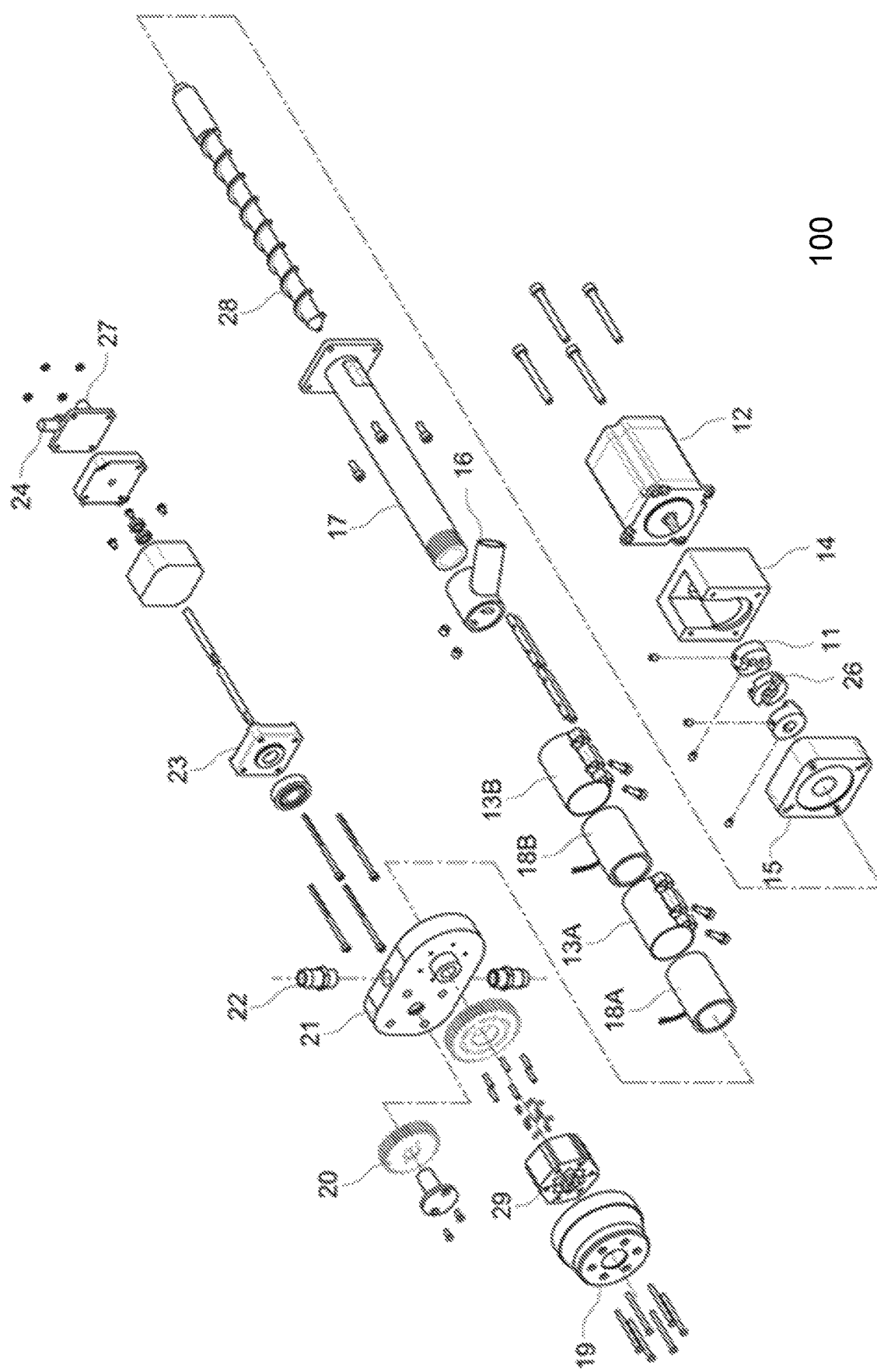
FIG. 3 depicts an exploded view of the variable nozzle extrusion system in FIG. 1 according to an exemplary embodiment of the invention.
Figure 4:
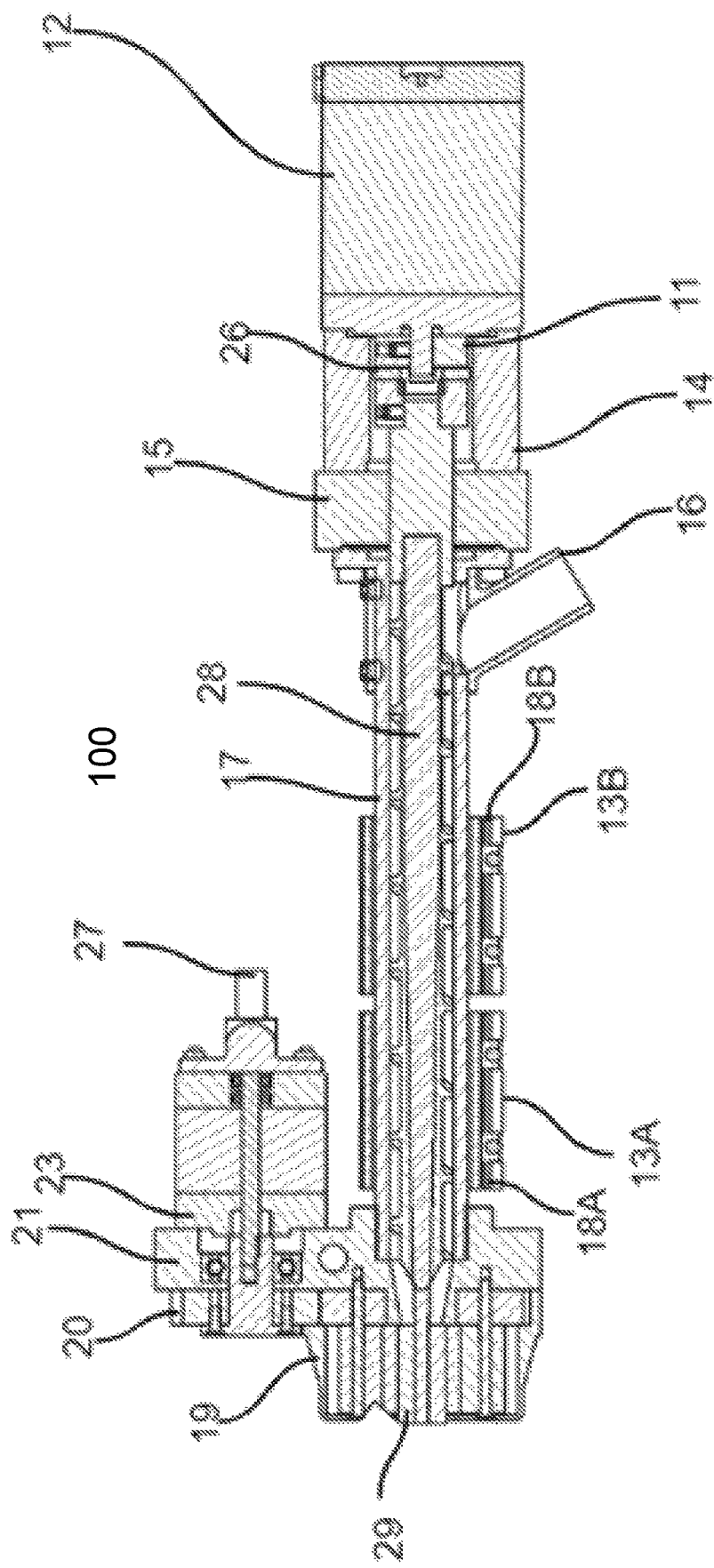
FIG. 4 depicts a cross section view of the variable nozzle extrusion system in FIG. 1 according to an exemplary embodiment of the invention.
Figure 5:
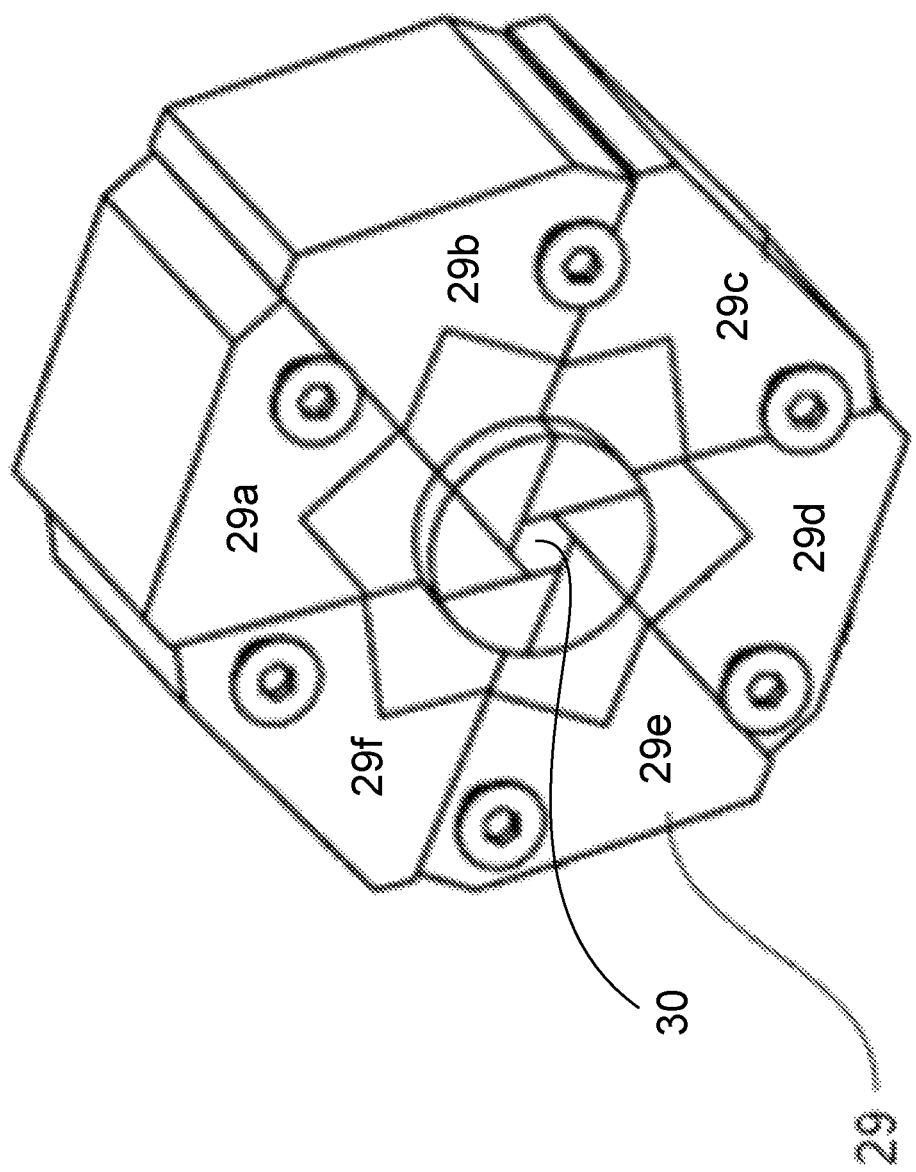
FIG. 5 depicts a close-up view of the variable extruder nozzle head in FIG. 1 according to an exemplary embodiment of the invention.

FIGS. 1-4 depict various views of a variable nozzle extrusion system according to exemplary embodiments of the invention. As depicted in the figures, a variable nozzle extrusion system 100 can include a screw coupler 11, an extruder screw DC motor 12, an extruder barrel heater clamp (e.g., components 13A and 13B), an extruder motor mount 14, a barrel-to-motor adapter 15, a pellet feeder mount 16, an extruder barrel 17, a heating element (e.g., components 18A and 18B), a variable extruder nozzle cover 19, a variable extruder gear system 20, a variable extruder housing 21, a liquid cooling inlet 22 (e.g., for the variable extruder housing 21), a variable extruder nozzle DC motor 23, a liquid cooling inlet 24 (e.g., for the variable extruder nozzle DC motor 23), a shaft coupler 26, a liquid cooling outlet 27 (e.g., for the variable extruder nozzle motor 23), a screw 28, and a variable extruder nozzle head 29, which is depicted in more detail in FIG. 5. For example, as depicted in FIG. 5, the extruder nozzle head 29 includes a plurality of jaws 29a-29f which can open and close in order to change the size of an orifice 30. According to another embodiment, the nozzle head 29 can include a different number of jaws.

Further, with regard to the variable nozzle extrusion system 100, as depicted in FIGS. 1-4, the DC motor 12 and the screw 28 are configured to engage with each other via the screw coupler 11 and the shaft coupler 26. The pellet feeder mount 16 can be fastened with screws to the extruder barrel 17. The tip of the extruder barrel 17 can be male-threaded, thereby allowing it to engage with the variable extruder housing 21, which can be female-threaded. The liquid cooling outlet 27 can be fastened to the variable extruder nozzle DC motor 23. The variable extruder housing 21 can also be fastened to the variable extruder nozzle DC motor 23. The variable extruder nozzle DC motor 23 can couple with the variable extruder gear system 20 through at least one set screw. The variable extruder nozzle head 29 can be fastened with screws to the variable extruder housing 21. The variable extruder nozzle cover 19 can also be fastened with screws to the variable extruder housing 21.

Figure 6:
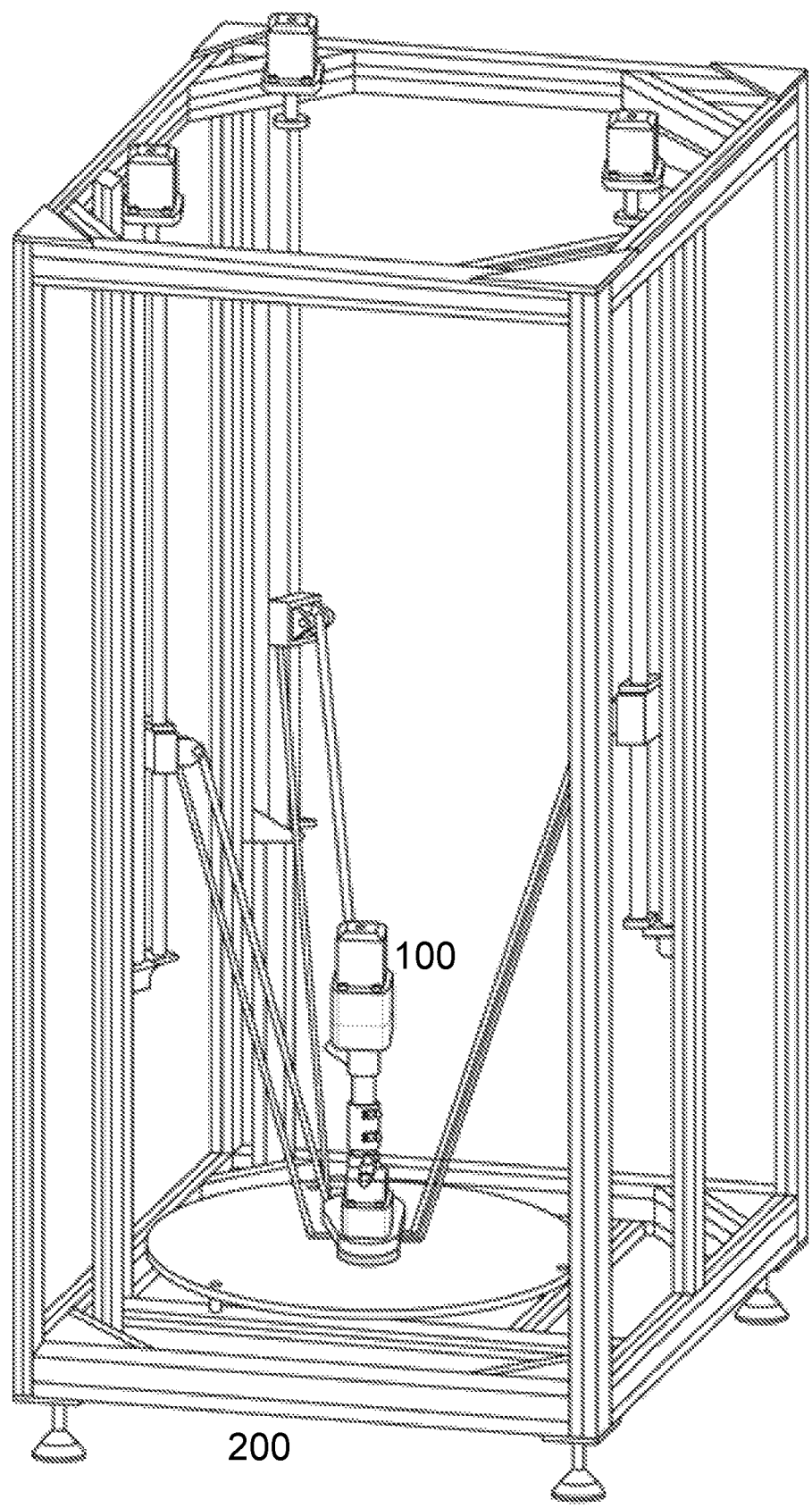
FIG. 6 depicts a 3D printer including a variable nozzle extrusion system according to an exemplary embodiment of the invention.

FIG. 6 depicts an exemplary 3D printer 200 including the variable nozzle extrusion system 100. For example, according to an embodiment, the variable nozzle extrusion system 100 can be connected to the XY axis of the 3D printer 200's motion system via a bracket or through taps on the variable nozzle housing 21.

According to an embodiment, the variable nozzle extrusion system 100 can facilitate variable throughput deposition modeling (VTDM) via a controlled orifice 30 at the end of extrusions system, e.g., nozzle head 29. In this regard, the orifice 30 in the nozzle head 29 can be adjustably opened and closed in order to increase or reduce the width and/or height of the tool path. As such, the variable nozzle extrusion system 100 can reduce the print time, increase the isotropic strength of the 3D-printed model, and maintain a high level of detail over the length of the print.

According to an embodiment, the variable nozzle extrusion system 100 can implement a screw-driven method to push material down to and out of the nozzle head 29. For example, the DC motor 12 spins the screw 28, which then spins pellets being provided via the pellet feeder mount 16, thereby pushing the pellets down the barrel 17 to the extruder barrel heater clamp and the heating element (e.g., components 13B, 18B, 13A, and 18A, respectively) where they are heated past a transition temperature. In particular, as the pellets move down the barrel 17, they slowly go through a melting zone where the heaters 18A and 18B will bring them to an optimal extrusion temperature depending on the material. According to an embodiment, the above-discussed screw-driven method allows for a high flow of material at high speeds and volume changes at the nozzle head 29.

Further, according to an embodiment, the barrel 17, the motors 12 and 23, and the other temperature sensitive-components can be water-cooled with the liquid cooling inlet 22, liquid cooling inlet 24, and the liquid cooling outlet 27.

Further, once the pellet material is liquefied, the variable extruder nozzle motor 23, which is mounted to the side of variable nozzle housing part 21 and controls the gears 20 for opening and closing the orifice 30 in the variable nozzle head 29, activates and configures the nozzle tip to a desired orifice opening size in order to achieve the correct line setting for the section being printed. In particular, the gears 20 interact with the jaws 29a-29f in order to achieve the desired orifice opening size for the orifice 30. According to an embodiment, the desired orifice opening size can be provided by software.

According to an embodiment, as this process continues line-by-line through the print, the extrusion system 100 will extrude material one line at a time, the width of the extruded material being variable in each segment of the lane and in each layer of the 3D build to generate the full model.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The foregoing detailed description of the present disclosure is to be understood as being in every respect illustrative and exemplary, but not restrictive, and the scope of the present disclosure provided herein is not to be determined solely from the detailed description, but rather from the claims as interpreted according to the full breadth and scope permitted by patent laws. It is to be understood that the embodiments shown and described herein are merely illustrative of the principles addressed by the present disclosure and that various modifications may be implemented by those skilled in the art without departing from the scope and spirit of the present disclosure. Those skilled in the art may implement various other feature combinations without departing from the scope and spirit of the present disclosure. The various functional modules shown are for illustrative purposes only, and may be combined, rearranged and/or otherwise modified.

The invention claimed is:

1. A material extrusion system for additive manufacturing, the system comprising:
 a pellet feeder mount configured to receive pellets of a material;
 a heater clamp and a heating element configured to heat the pellets of the material to a liquefied state; and
 a nozzle head configured to extrude the liquefied material of variable widths through an adjustable orifice, wherein the nozzle head includes a plurality of distinct adjustable jaws forming the adjustable orifice, wherein the plurality of distinct adjustable jaws interact with a motor and one or more gears to change a width of the adjustable orifice.

2. A material extrusion system for additive manufacturing, the system comprising:
 a nozzle head configured to extrude a liquefied material of variable widths through an adjustable orifice, wherein the nozzle head includes a plurality of distinct adjustable jaws forming the adjustable orifice, wherein the plurality of distinct adjustable jaws interact with a motor and one or more gears to change a width of the adjustable orifice.

3. The system of claim 2, further comprising:
 a screw, wherein the screw is configured to push the liquefied material through the nozzle head.

* * * * *